(12) United States Patent
Hoesl

(10) Patent No.: US 11,332,116 B2
(45) Date of Patent: May 17, 2022

(54) HYBRID DRIVE TRAIN FOR A HYBRID VEHICLE

(71) Applicant: Bayerische Motoren Werke Aktiengesellschaft, Munich (DE)

(72) Inventor: Andreas Hoesl, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 280 days.

(21) Appl. No.: 16/655,026

(22) Filed: Oct. 16, 2019

(65) Prior Publication Data

US 2020/0047740 A1    Feb. 13, 2020

Related U.S. Application Data

(63) Continuation of application No. PCT/EP2018/059705, filed on Apr. 17, 2018.

(30) Foreign Application Priority Data

Apr. 20, 2017 (DE) ..................... 10 2017 206 615.6

(51) Int. Cl.
*B60W 10/30* (2006.01)
*B60K 6/26* (2007.10)

(52) U.S. Cl.
CPC ............... *B60W 10/30* (2013.01); *B60K 6/26* (2013.01); *B60K 2006/268* (2013.01)

(58) Field of Classification Search
CPC ............. B60W 10/30; B60K 6/26; B60K 2006/268; B60K 2025/005; B60K 6/48; B60K 25/00; B60K 2006/4825; B60K 6/40; B60K 6/387; F02N 11/006; F02N 15/02; F02N 11/003

See application file for complete search history.

(56) References Cited

U.S. PATENT DOCUMENTS

| 7,695,400 B2* | 4/2010 | McGee | B60L 50/16 477/5 |
| 7,748,483 B2* | 7/2010 | Usoro | B60W 10/06 180/65.27 |
| 7,954,580 B2* | 6/2011 | Usoro | B60W 20/40 180/65.275 |

(Continued)

FOREIGN PATENT DOCUMENTS

| CN | 103153668 A | 6/2013 |
| CN | 105745106 A | 7/2016 |

(Continued)

OTHER PUBLICATIONS

PCT/EP2018/059705, International Search Report dated Jun. 20, 2018 (Three (3) pages).
German Search Report issued in German counterpart application No. 10 2017 206 615.6 dated Feb. 5, 2018, with Statement of Relevancy (Seven (7) pages).

(Continued)

*Primary Examiner* — David J Hlavka
(74) *Attorney, Agent, or Firm* — Crowell & Moring LLP

(57) ABSTRACT

A hybrid drive train for a hybrid vehicle includes an internal combustion engine configured to drive the hybrid vehicle and an output shaft configured to provide torque to drive the hybrid vehicle, and a transmission which has a transmission input shaft. The hybrid drive train also includes a first electric machine by which the transmission input shaft can be driven, a second electric machine by which the output shaft can be driven to start the internal combustion engine, and an auxiliary unit configured to be driven by the second electric machine.

17 Claims, 1 Drawing Sheet

(56) References Cited

U.S. PATENT DOCUMENTS

| | | | | |
|---|---|---|---|---|
| 9,074,656 | B2* | 7/2015 | Benz | F02N 11/04 |
| 9,441,599 | B2* | 9/2016 | Bangura | B60K 6/48 |
| 9,714,028 | B1* | 7/2017 | Moon | F16H 63/46 |
| 10,150,466 | B2* | 12/2018 | Kang | B60W 30/18036 |
| 10,415,532 | B2* | 9/2019 | Choi | B60K 6/485 |
| 2007/0191180 | A1* | 8/2007 | Yang | B60W 20/00 |
| | | | | 477/5 |
| 2009/0098976 | A1* | 4/2009 | Usoro | B60K 6/547 |
| | | | | 477/5 |
| 2012/0178569 | A1 | 7/2012 | Grochowski et al. | |
| 2013/0244829 | A1* | 9/2013 | Nefcy | B60W 10/11 |
| | | | | 477/15 |
| 2016/0327004 | A1* | 11/2016 | Cho | F02N 11/0851 |

FOREIGN PATENT DOCUMENTS

| | | |
|---|---|---|
| DE | 199 17 665 A1 | 10/2000 |
| DE | 10 2007 027 524 A1 | 12/2008 |
| DE | 10 2007 037 758 A1 | 3/2009 |
| DE | 10 2007 061 895 A1 | 6/2009 |
| DE | 10 2009 058 133 A1 | 6/2011 |
| DE | 10 2013 111 147 A1 | 4/2015 |
| DE | 10 2014 016 172 A1 | 5/2016 |
| EP | 3 047 994 A1 | 7/2016 |
| JP | 2012-232714 A | 11/2012 |

OTHER PUBLICATIONS

Chinese Office Action issued in Chinese application No. 201880014425.4 dated Oct. 26, 2021, with English translation (Fifteen (15) pages).

* cited by examiner

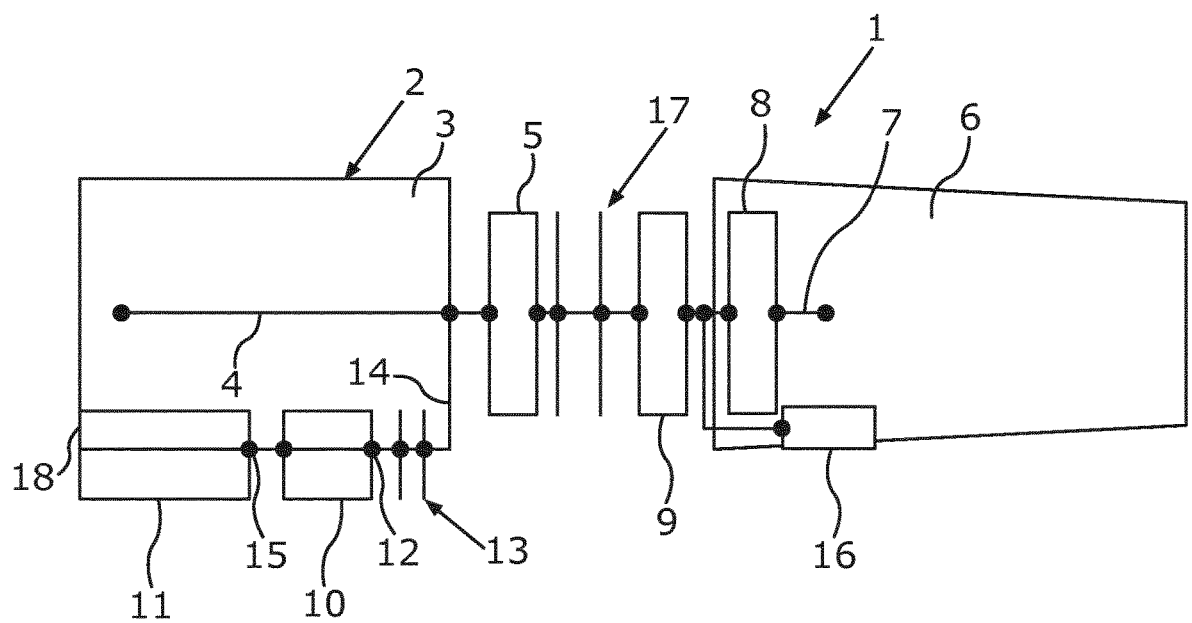

HYBRID DRIVE TRAIN FOR A HYBRID VEHICLE

CROSS REFERENCE TO RELATED APPLICATIONS

This application is a continuation of PCT International Application No. PCT/EP2018/059705, filed Apr. 17, 2018, which claims priority under 35 U.S.C. § 119 from German Patent Application No. 10 2017 206 615.6, filed Apr. 20, 2017, the entire disclosures of which are herein expressly incorporated by reference.

BACKGROUND AND SUMMARY OF THE INVENTION

The invention relates to a hybrid drive train for a hybrid vehicle, in particular for a passenger car.

A hybrid drive train of this type for a hybrid vehicle, in particular for a passenger car, is already known, for example, from DE 10 2007 061 895 A1. Here, the hybrid drive train comprises an internal combustion engine, by means of which the hybrid vehicle can be driven. Here, the internal combustion engine has at least one output shaft, by which the internal combustion engine can provide torques for driving the hybrid vehicle.

Furthermore, the hybrid drive train comprises a transmission which has a transmission input shaft. Via the transmission input shaft, torques can be introduced into the transmission which can, for example, convert the torques and as a consequence make them available. Furthermore, the hybrid drive train comprises at least one first electric machine, by means of which the transmission input shaft can be driven. As a result, at least one wheel of the hybrid vehicle or the hybrid drive train can be driven by the first electric machine, for example, via the transmission input shaft and therefore via the transmission, it being possible, for example, for a plurality of wheels of the hybrid drive train or the hybrid vehicle to be driven collectively by means of the first electric machine via the transmission input shaft.

Moreover, the hybrid drive train comprises at least one second electric machine, by means of which the output shaft can be driven in order to start the internal combustion engine. In other words, the second electric machine can drive the output shaft of the internal combustion engine, in order to start, that is to say to crank over, the internal combustion engine as a result. Therefore, the second electric machine can act, in particular, as what is known as a starter or cranking motor for starting or cranking over the internal combustion engine.

Furthermore, DE 10 2007 037 758 A1 discloses a hybrid vehicle, having an internal combustion engine, having a transmission, and having an electric machine which is arranged in a drive train section between the internal combustion engine and the transmission. Moreover, a clutch is provided which is arranged between the internal combustion engine and a rotor of the electric machine, it being possible for the internal combustion engine to be coupled to the electric machine and therefore to the transmission which is coupled to the electric machine by way of closure of the clutch. It is provided here that the clutch is a positively locking clutch.

It is an object of the present invention to develop a hybrid drive train of the type mentioned at the outset, in such a way that a particularly advantageous functionality of the hybrid drive train can be provided in a way which is particularly favorable in terms of installation space.

The hybrid drive train according to the invention for a hybrid vehicle, in particular for a passenger car, has an internal combustion engine which is configured to drive the hybrid vehicle and comprises at least one output shaft for providing torques for driving the hybrid vehicle. Moreover, the hybrid drive train comprises a transmission which has a transmission input shaft. Furthermore, the hybrid drive train has at least one first electric machine, by means of which the transmission input shaft can be driven. Moreover, at least one second electric machine is provided, by means of which the output shaft can be driven in order to start the internal combustion engine.

In order for it then to be possible for a particularly advantageous functionality of the hybrid drive train to be realized in a way which is particularly favorable in terms of installation space, at least one auxiliary unit is provided which is different than the internal combustion engine, than the electric machines, and than the transmission, and which can be driven by the second electric machine. According to the invention, the second electric machine is therefore given a dual function. Firstly, the second electric machine is used to drive the output shaft which is configured, for example, as a crankshaft, in order to start or to crank over the internal combustion engine as a result, that is to say, for example, to transfer it from non-combustion operation into combustion operation. Therefore, the second electric machine is used firstly as an electric cranking motor or electric starter for cranking over or starting the internal combustion engine. Secondly, the second electric machine is used, in order to drive auxiliary units, such as the abovementioned auxiliary unit, in particular in a manner which is independent from the output shaft or is independent from a state of the internal combustion engine. As a result, the number of parts, the installation space requirement, the weight and the costs of the hybrid drive train can be kept particularly low. Moreover, a function which is additional with respect to the internal combustion engine, the electric machines and the transmission can be provided by means of the auxiliary unit, with the result that a particularly advantageous functionality of the hybrid drive train can be realized in a manner which is favorable in terms of costs and installation space.

It has been found that a particularly advantageous functionality of the hybrid drive train can be realized by way of the drive capability according to the invention of the auxiliary unit, since the auxiliary unit can be driven by the second electric machine in a manner which is favorable in terms of installation space and weight, and can therefore fulfill its function or task. Wraparound drives such as belt drives are usually used, in order to drive at least one auxiliary unit of an internal combustion engine via a wraparound drive of this type by the internal combustion engine, in particular via its output shaft. The use of a wraparound drive of this type leads to a high number of parts, to a high weight, to a high installation space requirement and to high costs. Furthermore, a wraparound drive has additional drag losses, it then being possible for said problems and disadvantages to be avoided by virtue of the fact that a wraparound drive of this type for driving the drive unit can be dispensed with. Here, for example, a connecting drive, in particular a connecting drive which is different than a wraparound drive, is provided, via which the auxiliary unit can be driven. Furthermore, if a wraparound drive of this type is used, the drive of the respective auxiliary unit is dependent on the internal combustion engine, in particular on its state, in such a way that the auxiliary unit can usually be driven or is driven by the output shaft via the wraparound drive only when the internal combustion engine is activated, that is to say when the internal combustion engine is in its combustion operation. This disadvantage can then also be avoided in the case of the hybrid drive train according to the invention, since the auxiliary unit can be driven by means of the second electric machine, in particular when the internal combustion engine is deactivated, that is to say is not in its combustion operation and accordingly does not provide any torques via the output shaft, for example. Here, according to the invention, the second electric machine is not only given the task of driving the auxiliary unit, but the second electric machine is also configured according to the invention to drive the output shaft and therefore to crank over the internal combustion engine. As a result, the number of electric machines of the hybrid drive train can be kept low, since, for example, additional electric machines which are configured as belt starter generators or pinion starters for cranking over the internal combustion engine can be avoided.

Since the second electric machine is configured to drive the output shaft and, as a result, to start the internal combustion engine, the second electric machine has a starting functionality. The shifting of the starting functionality to the second electric machine makes it possible to utilize the system performance of the first electric machine completely for the propulsion of the hybrid vehicle. This is helpful, for example, for realizing electric crawling or driving and for rapid acceleration initiation after coasting operations, in which the internal combustion engine or the hybrid vehicle overall is coasting.

In order for it to be possible for the installation space requirement, the number of parts and the costs to be kept particularly low, it is provided in one advantageous refinement of the invention that the second electric machine is coupled or can be coupled to the output shaft mechanically. It is provided, in particular, that the second electric machine is coupled or can be coupled to the output shaft mechanically and without a wraparound means or without a traction mechanism. A coupling or coupling capability of this type without a wraparound means is to be understood to mean that the second electric machine is coupled or can be coupled to the output shaft, without using a wraparound means or a traction mechanism such as a belt or a chain to this end. In other words, no wraparound means or traction mechanism is used, in order to couple the second electric machine to the output shaft. As a result of said coupling capability or coupling without a wraparound means or traction mechanism, a wraparound drive or traction mechanism drive, in particular a belt drive, which is conventionally used can be avoided, as a result of which costs, frictional losses and installation space can be saved.

Furthermore, the use of a central coupling drive is conceivable, into which the second electric machine can be integrated. Said coupling drive can be, for example, a drive which is present in any case and is configured, for example, as a timing drive, via which at least one camshaft or a plurality of camshafts for actuating gas exchange valves can be driven. Here, the coupling drive, in particular the timing drive, is configured, for example, as a chain drive, gearwheel drive, belt drive or another type of coupling drive.

Furthermore, it is conceivable, for example, to combine torques which are provided by the first electric machine and by the second electric machine, in order to realize advantageous cold starting of the internal combustion engine as a result. To this end, it is provided, in particular, that the output shaft can also be driven by the first electric machine. In particular, this can ensure cold starting, without a separate, additional cranking motor such as a belt starter generator or a pinion starter being used.

In order to realize a particularly advantageous functionality, it is provided in a further refinement of the invention that a coupling device is arranged in a torque flow from the second electric machine to or onto the output shaft between the output shaft and the second electric machine, which coupling device can be switched over between at least one coupling state and at least one decoupling state. In the coupling state, the second electric machine is coupled to the output shaft via the coupling device, with the result that the output shaft can be driven by the second electric machine via the coupling device. In the decoupling state, however, the second electric machine is decoupled from the output shaft, with the result that the output shaft cannot be driven by the second electric machine via the coupling device. In other words, the second electric machine is disconnected from the output shaft in the decoupling state. Here, the coupling device is configured, for example, as a separating clutch, it being possible for the coupling device to be configured as a positively locking clutch, in particular as a claw coupling. As an alternative, it is conceivable that the coupling device is configured as a frictionally locking clutch and therefore, for example, as a friction clutch or multi-disk clutch. Moreover, the coupling device might be configured as a freewheel system, in particular as a switchable freewheel system. The coupling device is also called a disconnecting apparatus, since the second electric machine can be disconnected from the output shaft as required and can be coupled to the output shaft by means of the disconnecting apparatus.

As a result of the preferably mechanical coupling or coupling capability of the auxiliary unit to or onto the second electric machine, the auxiliary unit can be used, in particular if the coupling device is used, at least substantially independently of the internal combustion engine, in particular independently of its operating state, and can be driven, in particular, by means of the second electric machine. It is therefore conceivable that the second electric machine drives the auxiliary unit without also driving the output shaft when the coupling device is in its decoupling state. If the auxiliary unit is, for example, a refrigerant compressor which is also called an air conditioning compressor, it is thus possible to compress a refrigerant of an air conditioning system of the hybrid vehicle by means of the refrigerant compressor and, as a consequence, to cool the interior compartment of the hybrid vehicle or to supply it with cooled air, even when the internal combustion engine is deactivated and without the second electric machine also driving the output shaft. It is therefore possible, for example, to cool the interior compartment before driving commences and/or in other standstill phases with a switched off, in particular deactivated, internal combustion engine, for example during traffic light cycles, in order for it to be possible for particularly high driving comfort to be realized as a result.

In one particularly advantageous embodiment of the invention, the second electric machine has a first rotor, the auxiliary unit having a second rotor which can be driven by the first rotor. Here, for example, the second electric machine has a first stator, it being possible for the first rotor to be rotated about a rotational axis relative to the second stator. Here, for example, the first rotor can be driven by the first stator.

It has proven particularly advantageous here if the second rotor is arranged coaxially with respect to the first rotor, as a result of which the installation space requirement can be kept particularly low.

As an alternative or in addition, it is provided that the second rotor can be coupled or is coupled to the first rotor mechanically, in particular without a wraparound means or without a traction mechanism. As a result, the number of parts, the costs, the installation space requirement and the weight can be kept particularly low. Further coupling possibilities for coupling the rotors are, for example, direct drives, belt connections, gearwheel stages, shafts, etc., depending on where the individual auxiliary units and the second electric machine can be positioned.

A further embodiment is distinguished by the fact that the second rotor is connected or coupled fixedly to the first rotor so as to rotate with it. As a result of said fixed coupling of the rotors so as to rotate together, the auxiliary unit or the second rotor can be driven particularly effectively and efficiently, it being possible at the same time for the number of parts, the weight, the costs and the installation space requirement to be kept on a particularly low scale.

In the case of one particularly advantageous embodiment of the invention, the auxiliary unit can be driven by the output shaft, in particular via the second electric machine and in the process, for example, via the first rotor. As a result, particularly efficient operation of the auxiliary unit in a manner which is favorable in terms of installation space can be realized. If, for example, the auxiliary unit, in particular the second rotor, is driven by the output shaft and therefore by the internal combustion engine via the second electric machine, in particular via the first rotor, the second electric machine, in particular the first rotor, is also driven, for example, by the output shaft. Here, a load points shift can be realized, for example, by means of the second electric machine, with the result that efficient operation of the internal combustion engine can be provided in a way which is favorable in terms of installation space.

In order to achieve a particularly extensive functionality of the hybrid drive train, at least one second auxiliary unit is preferably provided which is different than the auxiliary unit, is provided in addition to the latter, and can be driven by the first electric machine. Here, for example, the first electric machine has a third rotor and, in particular, a third stator, it being possible for the third rotor to be rotated about a rotational axis relative to the third stator and, for example, to be driven by the third stator. Here, for example, the second auxiliary unit can be driven by the third rotor. In the case of said embodiment, the first electric machine is also given a dual function, since the first electric machine is used firstly to drive the transmission input shaft and therefore to drive at least one wheel of the hybrid vehicle or to drive the hybrid vehicle overall. Secondly, the first electric machine can be used to drive the second auxiliary unit which is configured, for example, as an oil pump, in particular as a transmission oil pump. As a result, the use of a further, separate and additional electric machine for driving the second auxiliary unit can be avoided, with the result that, in particular, the use of an electric transmission oil pump or an electric auxiliary unit can be avoided. Costs and weight can be saved as a result.

It is preferably provided here that the second auxiliary unit can be coupled or is coupled to the first electric machine mechanically, in particular without a wraparound means, with the result that the second auxiliary unit can be driven by the first electric machine without the use of a wraparound means, in particular a belt.

A further embodiment is distinguished by the fact that the electric machines have different electric operating voltages than one another. The costs and the weight can be kept particularly low as a result.

Finally, it has been shown to be particularly advantageous if the first electric machine has a higher electric operating voltage than the second electric machine. In particular, the electric operating voltage of the first electric machine is at least twice as high, in particular at least three times or four times as great, as the electric operating voltage of the second electric machine. As a result, an electrified drive or drive train can be provided in a particularly advantageous way. For example, the electric operating voltage of the first electric machine is 48 volts, with the result that the hybrid drive train is configured, for example, as a 48 volt electrified drive train. As a result of said configuration of the first electric machine as a 48 volt machine, the first electric machine can provide particularly high electric power outputs for driving the transmission input shaft and therefore the at least one wheel or the hybrid vehicle overall. As a consequence, for example, 10 volts are sufficient as operating voltage of the second electric machine, with the result that the second electric machine is preferably configured as a 12 volt machine. The costs, the weight and the installation space requirement can be kept particularly low as a result. Furthermore, it is conceivable that the electric machines have the same electric voltage, in particular operating voltage, which can be 48 volts, for example.

Further details of the invention result from the following description of one preferred exemplary embodiment with the associated drawing.

Other objects, advantages and novel features of the present invention will become apparent from the following detailed description of one or more preferred embodiments when considered in conjunction with the accompanying drawings.

BRIEF DESCRIPTION OF THE DRAWINGS

Here, the single FIGURE shows a diagrammatic illustration of a hybrid drive train for a hybrid vehicle, having an internal combustion engine, having a transmission, having a first electric machine and having a second electric machine, at least one auxiliary unit being provided which is different than the internal combustion engine, than the electric machines and than the transmission, and which can be driven by the second electric machine, by means of which an output shaft of the internal combustion engine can be driven.

DETAILED DESCRIPTION OF THE DRAWINGS

The single FIGURE shows a diagrammatic illustration of a hybrid drive train (denoted overall by 1) for a hybrid vehicle which is configured, for example, as a motor car, in particular as a passenger car, and can be driven by means of the hybrid drive train 1. The hybrid drive train 1 has an internal combustion engine 2, by means of which the hybrid vehicle can be driven. Here, the internal combustion engine 2 which is also called a combustion engine or combustion motor has a crankcase 3 which is configured, for example, as a cylinder crankcase, and an output shaft which is configured as a crankshaft 4, is mounted rotatably on the crankcase 3, and can therefore be rotated about a first rotational axis relative to the crankcase 3. Via the crankshaft 4, the internal combustion engine 2 can provide torques for driving the hybrid vehicle.

Furthermore, the hybrid drive train 1 has a torsional vibration damper 5 which is coupled to the crankshaft 4. Torsional vibrations or rotational non-uniformities of the crankshaft 4 can be damped by means of the torsional vibration damper 5.

Furthermore, the hybrid drive train 1 has a transmission 6 which is configured, for example, as a multi-step transmission and has, for example, a plurality of adjustable transmission ratios which are different than one another. The transmission 6 is configured, for example, as an automatic transmission, in particular as an automatic torque converter transmission, but can be configured as a manual transmission or another transmission as an alternative. Here, the transmission 6 has a transmission input shaft 7 which (as will be described in greater detail in the following text) can be driven by the internal combustion engine 2 via the crankshaft 4, that is to say by the crankshaft 4. In this way, for example, the torques which are provided by the internal combustion engine 2 via the crankshaft 4 can be introduced via the transmission input shaft 7 into the transmission 6 and can be converted by means of the transmission 6. The transmission 6 has, for example, a transmission output shaft which is not shown in the FIGURE, can be driven by the transmission input shaft 7, and via which the transmission 6 can provide torques for driving the hybrid vehicle.

The transmission 6 has, for example, a starting element 8 which is configured as a hydrodynamic torque converter in the case of the exemplary embodiment which is illustrated in the FIGURE. Via the hydrodynamic torque converter or via the starting element 8, the torques can be transmitted, for example, to the transmission input shaft 7 or can be introduced into the transmission 6.

Furthermore, the hybrid drive train 1 has a first electric machine 9, by means of which the transmission input shaft 7 can be driven, in particular via the starting element 8. This means that the first electric machine 9 is configured to provide torques. The torques which are provided by the first electric machine 9 can be transmitted to the transmission input shaft 7, in particular via the starting element 8, and can therefore be introduced into the transmission 6, with the result that, for example, the hybrid vehicle can be driven by the first electric machine 9 via the transmission 6. Therefore, for example, the first electric machine 9 is configured for driving the hybrid vehicle.

Moreover, the hybrid drive train 1 comprises a second electric machine 10 which is different than the first electric machine 9, is provided in addition to the latter, and by means of which the crankshaft 4 (output shaft) can be driven in order to start the internal combustion engine 2. Therefore, the electric machine 10 can be used as a cranking motor or starter for cranking over or starting the internal combustion engine 2. The cranking over or starting of the internal combustion engine 2 is to be understood to mean, in particular, that the internal combustion engine 2 is transferred from its non-combustion operation into its combustion operation.

In order then to realize a particularly advantageous functionality of the hybrid drive train 1 in a way which is particularly favorable in terms of installation space, weight and costs, at least one auxiliary unit 11 is provided which is different than the internal combustion engine 2, than the electric machines 9 and 10, than the transmission 6, than the starting element 8 and than the torsional vibration damper 5, and which can be driven by the second electric machine 10.

It can be seen overall that the electric machine 10 is therefore given a dual function. This is because the electric machine 10 is used firstly to drive the crankshaft 4 for cranking over or starting the internal combustion engine 2. Secondly, the electric machine 10 is used, in order to drive the auxiliary unit 11, with the result that the auxiliary unit 11 can perform its function, in particular independently of the operating state of the internal combustion engine 2. By means of the electric machine 10, the auxiliary unit 11 can be driven, for example, independently of whether the internal combustion engine 2 is activated or deactivated. It is therefore conceivable that the auxiliary unit 11 can be driven or is driven by the electric machine 10, in particular, even when the internal combustion engine 2 is deactivated.

In the case of the exemplary embodiment which is illustrated in the FIGURE, the auxiliary unit 11 is configured as a refrigerant compressor which is also called a compressor, an air conditioning compressor or a coolant compressor. Here, the hybrid vehicle has an air conditioning system which comprises an air conditioning circuit which can be flowed through by a refrigerant and the refrigerant compressor which is arranged in the air conditioning circuit. By way of driving of the refrigerant compressor, the refrigerant is conveyed and compressed by means of the refrigerant compressor. The compressed refrigerant is evaporated, for example, by means of an evaporator, as a result of which, for example, the refrigerant can absorb heat from air which flows around the evaporator. As a result, the air which flows around the evaporator is cooled, it being possible for the cooled air to be fed to the interior compartment of the hybrid vehicle. As a result, the interior compartment can be cooled. Since the refrigerant compressor can then be driven by means of the electric machine 10 even while the internal combustion engine 2 is deactivated, the interior compartment can be supplied with cooled air by means of the air conditioning system and can be cooled as a result even while the internal combustion engine 2 is deactivated. As a result, for example, it is possible to cool the interior compartment before driving commences, with the result that particularly high driving comfort can be provided.

In the case of the hybrid drive train 1, the second electric machine 10 can be coupled to the crankshaft 4 mechanically and without a wraparound means, that is to say without the use of a traction mechanism. This means that the second electric machine 10 can be coupled or is coupled to the crankshaft 4 mechanically, in particular in a torque-transmitting manner, without the use of a wraparound means or traction mechanism such as a belt.

Here, the second electric machine 10 has a first rotor 12 and a first stator, it being possible for the first rotor 12 to be rotated about a second rotational axis relative to the first stator. Here, for example, the second rotational axis runs at least substantially parallel to the first rotational axis, the second rotational axis being spaced apart from the first rotational axis. Here, the first rotor 12 can be driven by the first stator. The mechanical coupling capability of the crankshaft 4 to the electric machine 10 without a wraparound means is to be understood to mean that the rotor 12 of the electric machine 10 can be coupled to the crankshaft 4 mechanically and without a wraparound means, that is to say without the use of a wraparound means or traction mechanism, with the result that the crankshaft 4 can be driven by the electric machine 10 without a wraparound means being connected in between. In other words, the crankshaft 4 can be driven by the first stator via the rotor 12 without a wraparound means or traction mechanism being connected in between. Therefore, the crankshaft can be driven by the electric machine 10 without a traction mechanism.

Here, a coupling device 13 which is configured, for example, as a separating clutch is arranged in a torque flow from the second electric machine 10, in particular from the rotor 12, to the crankshaft 4 between the crankshaft 4 and the second electric machine 10, in particular the first rotor 12, which coupling device 13 can be switched over between at least one coupling state and at least one decoupling state. In the coupling state, the second electric machine 10, in particular the rotor 12, is coupled without a traction mechanism, in particular in a frictionally locking or positively locking manner, to the crankshaft 4 via the coupling device 13, with the result that the crankshaft 4 can then be driven by the rotor 12 via the coupling device 13. In the decoupling state, however, the second electric machine 10, in particular the rotor 12, is decoupled from the crankshaft 4, with the result that the crankshaft 4 cannot be driven by the first rotor 12 via the coupling device 13 in the decoupling state.

As a result of the use of the coupling device 13, it is possible that the electric machine 10, in particular the rotor 12, drives the auxiliary unit 11 during a time period, during which the internal combustion engine 2 is deactivated, without the electric machine 10 or the rotor 12 in the process also driving the crankshaft 4. If the coupling device 13 is namely open, that is to say the coupling device 13 is in its decoupling state, the rotor 12 can be driven by the first stator without driving the crankshaft 4.

The mechanical coupling or coupling capability of the electric machine 10, in particular the rotor 12, to the crankshaft 4 takes place, for example, via a correspondingly powerful transverse drive 14 which is, in particular, without a wraparound means and preferably at the same time forms or provides at least one part of a timing drive, in particular of the internal combustion engine 2.

As an alternative to the coupling capability or coupling of the electric machine 10 to the crankshaft 4 without a wraparound means, it can be provided that the crankshaft 4 can be driven by the electric machine 10, in particular by the rotor 12, via at least one wraparound means such as a belt. In the case of the exemplary embodiment which is illustrated in the FIGURE, for example, the crankshaft 4 can be driven here by the electric machine 10 via at least one wraparound means and via the coupling device 13. The wraparound means, via which the crankshaft 4 can be driven by the electric machine 10, is, for example, a wraparound means of the abovementioned timing drive and is configured here, in particular, as a chain or belt, in particular a toothed belt. Therefore, the wraparound means which is provided in any case, is assigned to the timing drive and is also called a traction mechanism can be used to drive the crankshaft 4 by the rotor 12 via the wraparound means. As a result of the use of a wraparound means of this type to couple the crankshaft 4 to the electric machine 10, the electric machine 10 is coupled or can be coupled to the crankshaft 4, for example, mechanically but not without a wraparound means. Here, for example, the electric machine 10 is integrated into the timing drive.

The timing drive is used, in particular, to drive at least one camshaft for actuating at least one gas exchange valve by the crankshaft 4 via the timing drive. Therefore, for example, the timing drive is given a dual function, since the timing drive, in particular the wraparound means, is used firstly to drive the camshaft. Secondly, the timing drive, in particular its wraparound means, is used to drive the crankshaft 4 by means of the electric machine 10. If the auxiliary unit 11 is then driven by means of the electric machine 10 while the coupling device 13 is open, it is avoided that the electric machine 10 also drives the timing drive and therefore the crankshaft 4 and the camshaft or the wraparound means of the timing drive.

In the case of the exemplary embodiment which is illustrated in the FIGURE, the auxiliary unit 11 has a second rotor 15 which can be driven by the first rotor 12. The second rotor 15 comprises, for example, at least one shaft. In particular, the second rotor 15 can have a conveying element which is connected, for example, fixedly to the shaft so as to rotate with it for conveying and compressing the refrigerant, with the result that the conveying element can be driven by the first rotor 12 via the shaft. It is preferably provided here that the second rotor 15 is arranged coaxially with respect to the first rotor 12, with the result that the rotors 12 and 15 can be rotated about the same second rotational axis.

In order for it to be possible here for the costs, the weight and the installation space requirement to be kept particularly low, the second rotor 15 can be coupled or is coupled to the first rotor 12 mechanically and in the process preferably without a wraparound means. The second rotor 15 is preferably connected fixedly to the first rotor 12 so as to rotate with it without a wraparound means, with the result that the second rotor 15 can be driven by the first rotor 12 without the use of a wraparound means.

It has been shown to be advantageous, furthermore, if the auxiliary unit 11, in particular the second rotor 15, can be driven by the crankshaft 4 and in the process via the second electric machine 10 or the first rotor 12. To this end, for example, the coupling device 13 is in its coupling state, with the result that torques which are provided by the crankshaft 4 are transmitted to the rotor 15 via the closed coupling device 13 and the rotor 12. Here, for example, the crankshaft 4 also drives the rotor 12.

Furthermore, the hybrid drive train 1 has at least one second auxiliary unit 16 which is different than the auxiliary unit 11 and is configured as a transmission oil pump in the case of the exemplary embodiment which is shown in the FIGURE. An oil for lubricating and/or cooling and/or actuating the transmission 6 can be conveyed by means of the transmission oil pump. Here, the second auxiliary unit 16 can be driven by the first electric machine 9. The electric machine 9 has, for example, a third rotor (not shown in greater detail in the FIGURE) and a third stator (not shown in the FIGURE), it being possible for the third rotor to be rotated about a third rotational axis relative to the third stator. Here, for example, the third rotor is arranged on the transmission input shaft 7 or is arranged coaxially with respect to the transmission input shaft 7 and with respect to the crankshaft 4, with the result that the third rotational axis coincides with the first rotational axis. Furthermore, the third rotor can be driven by the third stator, with the result that, for example, the transmission input shaft 7 can be driven by the third stator via the third rotor. In particular, the second auxiliary unit 16 can be driven by the third stator via the third rotor. Here, for example, the second auxiliary unit 16 can be coupled or is coupled to the electric machine 9, in particular to the third rotor, mechanically and preferably without a wraparound means.

Moreover, it is conceivable that no mechanical auxiliary unit is to be driven in the transmission 6, with the result that, for example, an electric actuator system is then provided.

Moreover, a clutch device 17 is provided which is configured, for example, as a separating clutch or is also called a separating clutch and which is arranged between the crankshaft 4 and the electric machine 9, in particular between the torsional vibration damper 5 and the electric machine 9, in relation to a torque flow from the crankshaft 4 to the electric machine 9, in particular to the third rotor. Therefore, the torsional vibration damper 5 is arranged upstream of the separating clutch 17. As an alternative, it would be conceivable that the torsional vibration damper 5 is arranged behind or downstream of the separating clutch 17.

Here, the clutch device 17 can be switched over between at least one closed state and at least one open state. In the closed state, the crankshaft 4 is coupled via the clutch device 17 to the electric machine 9, in particular to the third rotor, with the result that, for example, the crankshaft 4 can be driven via the clutch device 17 by the electric machine 9 or by the third rotor, or vice versa. In the open state, however, the crankshaft 4 is coupled from the electric machine 9, in particular from the third rotor, with the result that the crankshaft 4 cannot be driven via the clutch device 17 by the electric machine 9, in particular by the third rotor, or vice versa. If, for example, the clutch device 17 is opened, that is to say is set into its open state, purely electric driving of the hybrid drive train can be realized, since the transmission input shaft 7 and therefore the hybrid vehicle can then be driven by means of the electric machine 9, without the hybrid vehicle being driven by the internal combustion engine 2 and without the electric machine 9 also driving the crankshaft 4. In order to save fuel in the process, the internal combustion engine 2 which can be operated by means of the fuel which is, in particular, liquid can be deactivated. In order to continue to cool the interior compartment efficiently in the process, the coupling device 13 is opened, for example, and the auxiliary unit 11 (refrigerant compressor) is driven by means of the electric machine 10. Therefore, an electric power output which is provided by the electric machine 9 can be used exclusively or at least for a very large part for driving the hybrid vehicle, since the electric machine 9 does not have to drive the auxiliary unit 11. Furthermore, it is avoided that the crankshaft 4 is also moved by the electric machines 9 and 10 while the internal combustion engine 2 is deactivated.

Furthermore, it is conceivable that a third auxiliary unit 18 is provided as an alternative or in addition which, for example, can be driven by the electric machine 10 in the described way as an alternative or in addition to the auxiliary unit 11. Here, the auxiliary unit 18 is configured, for example, as a liquid pump, by means of which a cooling liquid for cooling the internal combustion engine 2 can be conveyed. Since the cooling liquid is also called cooling water or water, the auxiliary unit 18 is also called a water pump.

In order for it to be possible firstly for particularly high electric power outputs for driving the hybrid vehicle to be realized, and in order for it to be possible secondly for the costs, the installation space requirement and the weight to be kept low, the electric machines 9 and 10 preferably have different operating voltages than one another. Here, for example, the electric operating voltage of the electric machine 9 is at least three times, in particular at least four times, greater than the electric operating voltage of the electric machine 10. For example, the electric machine 9 has an operating voltage of 48 volts, with the result that particularly high electric power outputs for driving the hybrid vehicle can be realized. Here, the electric machine 10 is preferably configured as a 12 volt machine, with the result that the electric machine 10 preferably has an operating voltage of 12 volts. Here, the operating voltage of 12 volts is sufficient, in order to start the internal combustion engine 2 and to drive the auxiliary unit 11 and/or 18.

LIST OF DESIGNATIONS

1 Hybrid drive train
2 Internal combustion engine
3 Crankcase
4 Crankshaft
5 Torsional vibration damper
6 Transmission
7 Transmission input shaft
8 Starting element
9 First electric machine
10 Second electric machine
11 Auxiliary unit
12 First rotor
13 Coupling device
14 Transverse drive
15 Second rotor
16 Second auxiliary unit
17 Clutch device
18 Third auxiliary unit The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hybrid drive train for a hybrid vehicle, comprising:
    an internal combustion engine configured to drive the hybrid vehicle and an output shaft configured to provide torque to drive the hybrid vehicle;
    a transmission which has a transmission input shaft;
    a first electric machine by which the transmission input shaft can be driven;
    a second electric machine by which the output shaft can be driven to start the internal combustion engine;
    an auxiliary unit configured to be driven by the second electric machine; and
    an additional auxiliary unit configured to be driven by the first electric machine.

2. The hybrid drive train according to claim 1, wherein the second electric machine is configured to be coupled to the output shaft mechanically without a wraparound means.

3. The hybrid drive train according to claim 1, wherein a coupling device is arranged in a torque flow from the second electric machine to the output shaft between the output shaft and the second electric machine, wherein the coupling device is configured to be switched over between a coupling state, in which the second electric machine is coupled to the output shaft via the coupling device, and a decoupling state, in which the second electric machine is decoupled from the output shaft.

4. The hybrid drive train according to claim 2, wherein a coupling device is arranged in a torque flow from the second electric machine to the output shaft between the output shaft and the second electric machine, wherein the coupling device is configured to be switched over between a coupling state, in which the second electric machine is coupled to the output shaft via the coupling device, and a decoupling state, in which the second electric machine is decoupled from the output shaft.

5. The hybrid drive train according to claim 1, wherein in the second electric machine has a first rotor, and the auxiliary unit has a second rotor configured to be driven by the first rotor.

6. The hybrid drive train according to claim 2, wherein in the second electric machine has a first rotor, and the auxiliary unit has a second rotor configured to be driven by the first rotor.

7. The hybrid drive train according to claim 3, wherein in the second electric machine has a first rotor, and the auxiliary unit has a second rotor configured to be driven by the first rotor.

8. The hybrid drive train according to claim 5, wherein the second rotor is arranged coaxially with respect to the first rotor, and/or the second rotor is configured to be coupled to the first rotor mechanically without a wraparound means.

9. The hybrid drive train according to claim 6, wherein the second rotor is arranged coaxially with respect to the first rotor, and/or the second rotor is configured to be coupled to the first rotor mechanically without a wraparound means.

10. The hybrid drive train according to claim 7, wherein the second rotor is arranged coaxially with respect to the first rotor, and/or the second rotor is configured to be coupled to the first rotor mechanically without a wraparound means.

11. The hybrid drive train according to claim 5, wherein the second rotor is connected fixedly to the first rotor so as to rotate with it.

12. The hybrid drive train according to claim 8, wherein the second rotor is connected fixedly to the first rotor so as to rotate with it.

13. The hybrid drive train according to claim 1, wherein the auxiliary unit is configured to be driven by the output shaft via the second electric machine.

14. The hybrid drive train according to claim 2, wherein the auxiliary unit is configured to be driven by the output shaft via the second electric machine.

15. The hybrid drive train according to claim 3, wherein the auxiliary unit is configured to be driven by the output shaft via the second electric machine.

16. A hybrid drive train for a hybrid vehicle, comprising:
an internal combustion engine configured to drive the hybrid vehicle and an output shaft configured to provide torque to drive the hybrid vehicle;
a transmission which has a transmission input shaft;
a first electric machine by which the transmission input shaft can be driven;
a second electric machine by which the output shaft can be driven to start the internal combustion engine; and
an auxiliary unit configured to be driven by the second electric machine;
wherein the first and second electric machines have electric operating voltages which are different than one another.

17. The hybrid drive train according to claim 16, wherein the first electric machine has a higher electric operating voltage than the second electric machine.

\* \* \* \* \*